United States Patent [19]

Delmon et al.

[11] 4,001,362
[45] Jan. 4, 1977

[54] METHOD FOR THE TREATMENT OF CLAY AND PRODUCTS OBTAINED

[75] Inventors: Bernard Delmon, Wavre; Jacques LeMaitre; Michel Bulens, both of Brussels, all of Belgium

[73] Assignee: UNIBRA, Brussels, Belgium

[22] Filed: Sept. 18, 1974

[21] Appl. No.: 507,177

[30] Foreign Application Priority Data

Oct. 3, 1973 France .................... 73.35287
May 31, 1974 France .................... 74.18959

[52] U.S. Cl. ................... 264/56; 106/72
[51] Int. Cl.² ........................ C04B 33/32
[58] Field of Search ............. 264/56; 106/72, 73

[56] References Cited

UNITED STATES PATENTS

| 2,000,338 | 5/1935 | Kliefoth | 264/56 |
| 3,674,521 | 7/1972 | Noble | 106/73 |
| 3,690,907 | 9/1972 | Kroening et al. | 106/73 |

FOREIGN PATENTS OR APPLICATIONS

| 43-4512 | 0000 | Japan | 106/72 |
| 338,726 | 11/1930 | United Kingdom | 106/72 |
| 1,104,281 | 2/1961 | United Kingdom | 106/72 |

OTHER PUBLICATIONS

Singer et al., *Industrial Ceramics*, pp. 76–84, 249 (1963).
"Clay Modifiers", *Brick and Clay Record*, pp. 50–61, Nov. 1958.

*Primary Examiner*—Donald J. Arnold
*Assistant Examiner*—John Parrish
*Attorney, Agent, or Firm*—Burgess, Dinklage & Sprung

[57] ABSTRACT

The object of the invention is to provide a method for the treatment of all kinds of clay or any ceramic composition based on clay.

The method consists in distributing in the clay metal ions capable of forming the corresponding oxide at a temperature at the most equal to the firing temperature of the clay thus treated, by maintaining the clay in contact with a liquid phase under conditions such that said ions pass at least in part into the liquid phase and a diffusion of said ions throughout the mass of clay is ensured.

21 Claims, No Drawings

METHOD FOR THE TREATMENT OF CLAY AND PRODUCTS OBTAINED

The object of the present invention is to provide a method for the treatment of clay, which may be applied to any ceramic composition based on clay and it also relates to the clays and clay ceramic compositions once treated according to said method, and to the ceramic products obtained from them by firing.

The invention aims essentially at facilitating the firing process and improving the properties of the final products, these results being obtained through the addition of metal compounds to the clay.

It is already known to add metallic compounds to clay ceramic compositions, prior to forming and firing. For instance, the addition of lithium oxide has been proposed in order to obtain, after firing, products with a particularly low thermal expansion coefficient, and the addition of magnesium or calcium oxide in order to obtain china-ware products which exhibit a high electric insulation power. Most usually, the clay is admixed with fluxes consisting of alkaline metals or alkaline-earth metals which, during firing, form fusible oxide eutectics by reacting with the alumina and the silica contained in the clay, thereby giving rise to a liquid phase which vitrifies on cooling and binds together the grains of the ceramic obtained. By these known methods, the metal compounds used are most usually simple oxides, sometimes complex oxides such as aluminates, silicates or alumino-silicates, and seldom other compounds such as calcium carbonate, but such metal compounds are always substances which remain solid up to the firing temperature of the clay.

In other methods, soluble metal salts are sometimes used in the industry of ceramics, in order to control either the rheological properties of unfired clay pastes, or the viscosity of the clay slurries or slips, or else to act on the flocculation or deflocculation of colloidal suspensions of clay in water. In such cases, the amounts of salts used are very low (of the order of a few grams per cubic meter of water, or lower than one thousandth of the clay weight) and, even though they are high enough to modify the properties of water and suspensions, they have substantially no incidence on the firing process of the clay or the composition of the fired products.

The same applies to another known method wherein feldspars are reacted with a potassium compound in dry conditions to increase their potassium oxide content, since in that case, any soluble material is carefully removed from the mixture prior to forming and firing.

An object of the invention is to provide a method for the treatment of clay, which enables the density and the mechanical resistance of the products obtained by firing clay ceramic compositions to be increased and their manufacture to be facilitated, notably by allowing a lower firing curing temperature, while still leading to a product having properties at least as high as those of the ceramics obtained by firing at higher temperatures.

It thus relates to a method for the treatment of clay, which consists in distributing in the clay metal ions capable of forming the corresponding oxide at a temperature at the most equal to the firing temperature of the clay thus treated, by maintaining the clay in contact with a liquid phase under conditions such that said ions pass at least in part into the liquid phase and a diffusion of said ions throughout the mass of clay is ensured.

The invention may apply to the treatment of all kinds of clay, which clays are, as is well known, essentially made of hydrated alumino-silicates. Such alumino-silicates comprise kaolinite, montmorillonite, bentonite, halloysites and mixtures of such minerals. They are commonly contained in clays together with various impurities originating from the natural minerals.

A particularly advantageous, although not limitative, application of the invention relates to the treatment of kaolin, which is a clay mainly constituted by kaolinite (an hydrated aluminum silicate) and further comprising silica essentially. The invention may be applied as well to the treatment of any ceramic composition based on clay, i.e. to any composition which contains a substantial proportion of clay. Generally speaking, the amount of clay in the composition should allow the composition to be formed or shaped prior to being fired. Thus, the method may be applied, for instance, to the treatment of clay-and-silica compositions used in the manufacture of stoneware. Such compositions contain for instance 20 to 40 parts of silica and 80 to 60 parts of clay (by weight).

According to the method of the invention, the step of distributing and diffusing the metal ions in the clay is preferably followed by the shaping (or forming) and firing of the clay containing said ions at a temperature high enough for these ions to react into oxides in the fired product.

The amount of the metal ions distributed in the clay is preferably such that their molar content is between 1 and 40%, and preferably between 5 and 20%, with respect to the alumina contained in the clay. It should be understood here that part of these ions, or sometimes even the whole of them, may be initially contained in the clay or the clay composition to be treated, for instance as a solid compound forming an impurety therein.

According to the invention, the metal ions used may be initially present in and/or admixed with the clay as a compound at least partially soluble in water or fusible and the method of treatment includes a step of impregnating the clay with said compound in the liquid state, either in solution or melted, the compound used being able to form a corresponding metal oxide at a decomposition temperature at most equal to the firing temperature of the impregnated clay.

The compound may have a solubility high enough to pass entirely in solution as the clay is formed under usual conditions, more particularly with usual values for the humidity or water content in the paste formed. Conventional mixing times, of the order of 5 minutes to 1 hour, are then sufficient to ensure the diffusion of the metal ions throughout the mass of clay.

Nevertheless, the impregnation by the compound in the liquid state, whether it is dissolved or melted, does not necessarily mean that this compound, which may be designated as a "wetting" compound, should be prepared as a solution or melted prior to being admixed to the clay. On the opposite, it is often preferred to mix a compound in solid state with the clay, which compound becomes liquid afterwards, by being dissolved or melted under the conditions used for forming and heating the clay, at a temperature below its decomposition temperature. The melting may possibly occur owing to the formation of an eutectic between two metal compounds used in combination. The dissolution may occur at the room temperature; it may also be initiated by heating the mixture up to a temperature which remains below the temperature at which the metal compound decomposes into an oxide. For instance, the compound may dissolve in the wetting or moistening water which is normally added to the clay to allow its being formed and worked up, but it may also dissolve in the hydration water of crystallized salts. As a matter of fact, it appeared preferable, in carrying out the method according to the invention, to restrict to relatively low values the amount of water added to the clay. Thus, the water content in the ceramic composition comprising the clay and the impregnating metal compound, at the time of forming, is preferably limited to values below 20% by weight. In such cases, forming is advantageously effected by dry-pressing at a humidity content below 2%, or by pressing a moistened paste with a humidity content below 10%, under a pressure generally from 100 kg/cm² to 5 metric tons per cm². The pressing technics are known per se.

According to a specific embodiment of the invention, it is not required that all the metal ions be simultaneously in a liquid phase, in a dissolved or melted state. On the opposite, it is preferred to make only a fraction of the ions pass in the liquid phase at each moment, out of a solid compound present in the clay or admixed with the latter, for example by partly dissolving this compound, provided that the mixture is contacted with the liquid phase for a sufficient time to ensure the diffusion of the metal ions throughout the clay.

Thus, according to a preferred embodiment of the method of the invention, the clay is mixed with at least one solid compound containing metal ions capable of forming the corresponding oxide at a temperature at most equal to the firing temperature of the clay after treatment, and the mixture obtained is kept in contact with an aqueous solution of same ions for a sufficient time to ensure the diffusion of said ions throughout the mass of the clay.

It is thus possible to use solid compounds with little solubility in water and not capable of liquefying before decomposition, and hence currently available and cheap compounds. Such compounds can moreover occur for the whole or part of their amount, in the clay or the composition to be treated, as impureties.

In one of the preferred embodiments of the method, the mixture containing the clay and the solid compound is placed in the form of a paste or of a slurry or slip by means of an aqueous solution containing a substance capable of solubilizing, although it may be very partially, the metal ions of the compound, for example by means of a solution of an acid forming a soluble salt with these ions. In another embodiment, a similar paste or slurry is formed by using an aqueous solution containing a soluble compound of the same ions as said solid compound.

In both cases, an "ageing" of the slurry or paste obtained is then ensured, in the course of which the solid components of the mixture remain in contact with an aqueous phase containing a fraction of the metal ions in solution. The aqueous solution is preferably in the proportion of at least 3 percent with respect to the weight of solid components and most frequently, from 10 to 25%, but generally speaking, part at least of the ageing treatment may be performed with a much higher proportion of such solution, up to 20 times the weight of solid components. The concentration of the metal ions in the aqueous solution is advantageously at least 0.001 gram-ion per liter, and preferably from 0.02 to 2 gram-ions per liter.

The ageing treatment of the clay, in the method according to the invention, is advantageously carried out for a time from 10 to 100 hours, and preferably from 25 to 50 hours. This ageing treatment can be carried out with or without stirring, at atmospheric or higher pressures, and at any temperature from about 0° C to about 200° C. Generally, it is preferred, for easier operation, to carry out the treatment at least in part under atmospheric pressure and at ambient temperature. However, it may also be advantageous to operate the treatment at higher temperatures so as to be able to reduce the time of treatment, in particular at a temperature of the order of 80° to 100° C under atmospheric pressure, or under pressure at temperatures of the order of 100° to 200° C. In addition, the treatment is preferably carried out in an atmosphere saturated with moisture. It may advantageously be complemented, after drying and grinding the products, by a humidifying treatment of the powder obtained in an oven, preferably at a temperature of 30° to 200° C and in an atmosphere of substantially 100% humidity, for 2 to 30 hours.

According to the invention, the ageing treatment enables a diffusion of the metal ions admixed with the clay to be performed, throughout the latter, on the microscopic scale, even though these ions may be incorporated in the clay to a major extent as a compound with little solubility in water and which cannot melt and while avoiding being compulsed to use large amounts of an acid to dissolve them. This diffusion process is similar to that which can be performed by other modes of operation of the method wherein it is ensured from a compound which is entirely dissolved or melted, with contact time which may then be substantially reduced.

The above observation leads to the assumption that when a clay containing a compound with little water solubility, such as calcium carbonate, is let to macerate or "age" in contact with an aqueous solution of calcium chloride for instance, a series of combined phenomena is produced which include dissolution of the calcium and its deposition in the form of chloride, carbonate, or hydroxide, and which gradually propagate throughout the mass, leading in the whole to a transfer of ions through the aqueous phase. However, it must be understood that such an attemptative explanation should in no case serve as a purpose for a restrictive interpretation of the scope of the invention.

The metal ions which may be used according to the invention are notably those of the alkaline metals, of the alkaline-earth metals or of the transition metals, the last mentioned expression being taken in its broad sense and covering not only the elements of group VIII of the periodic chart, but also those of groups Ib, IIb, VIa, VIIa, as well as lead. Preferred examples of such metals are lithium, sodium, potassium, magnesium, calcium, barium, ion, zinc, manganese, copper, chromium, and lead.

Such metals are advantageously incorporated into the clay as oxides, hydroxides, or salts of organic or inorganic acids. Specific water soluble salts in the case of alkaline or alkaline-earth metals, are especially nitrates, chlorides, citrates, oxalates, formates, and metal salts of fatty acids or hydroxy acids. Nevertheless, any other metal compound may be used, particularly the metal derivatives of organic hydroxy-compounds such as alcoholates, phenates, or enolates. In the case of transition elements, and more specifically copper, ion, zinc, lead, preferred salts are chlorides, nitrates, sulphates and organic acid salts such as formic, oxalic, acetic, citric, lactic or malic acids.

Valuable results have been obtained, especially when applying the method of the invention to the treatment of clays or composition comprising kaolinite as a major component, by selecting such impregnating compounds as calcium or magnesium nitrates, preferably incorporated as hydrated crystalline salts.

According to an alternative embodiment, calcium ions are incorporated into the clay as calcium carbonate or hydroxide and may be diffused throughout the clay by contacting the mixture with a chlorhydric or calcium hydroxide solution.

Of course, all metal compounds may be used solely or in combination.

According to the invention, the compound mixed with the clay is selected so that it may transform into the corresponding metal oxide at a temperature of decomposition which is at most equal to the firing temperature. The firing temperature can be substantially lowered with respect to the firing temperatures used in known methods. For instance, in the case of a clay mainly made of kaolinite, the firing temperature is advantageously from 750° to 1100° C, or preferably from 800° to 1000° C, and still preferably of the order of 900° C. The generation of the oxide may be due to the mere pyrolysis of an oxigenated salt, or to the oxidation, generally oxidation in the air, of such salts or chlorides. The oxide formation may occur either directly when heating the ceramic composition up to firing, or in the course of a preliminary calcination process. The calcination process is carried out advantageously at a temperature from 400° to 600° C. Thus, the impregnating compound used in the method of the invention should preferably be a compound which is liable to decompose, by mere pyrolysis, or by oxidation in the air, into the corresponding metal oxide, at a temperature below 900° C and, preferably, below 600° C.

Generally speaking, the working up of the compositions containing the clay and the impregnating compound may be effected according to any one of the conventional technics, until fired ceramic products are obtained. By way of examples, the dry powdered clay and a dry solid metal compound may be mixed and moistened or a clay paste may alternately be prepared with a substantial amount of water in which the metal compound dissolves, before the paste is formed, dried and fired. However, according to a preferred embodiment according to the invention, the method includes a calcination step wherein the impregnated clay is heated at a temperature at least equal to the decomposition temperature of the impregnating compound. The calcined clay, cooled down to room temperature, may then be possibly ground, then formed and fired as already stated, forming being preferably effected by dry pressing or by pressing a moistened paste.

Of course, the invention does not only relate to the method for the treatment of clays or clay compositions, but it also extends to the ceramic compositions such as may be obtained by this method, and among them notably to the impregnated and calcined clay and to the ceramics obtained by firing said compositions.

The diffusion of metal ions in the clay, according to the method of the invention, and the subsequent formation of the mineralizing metal oxide from the metal compound used help to the sintering of the constituents and improve the densification and the mechanical resistance of the ceramic products obtained after firing. The oxide is produced in a very finely divided form; and it seems that the fact that the oxide is highly divided, together with the good dispersion of the same in the clay, induce a high chemical reactivity between the constituents, which reactivity promotes the sintering. Moreover, the products obtained, as regards their structure as well as their properties, proove superior to those manufactured by conventional methods which involve the addition of a flux. More particularly, the method of the invention makes it possible to obtain products which are still very homogeneous, the proportion of amorphous phase being generally of at least 95%. The densification is also improved. Furthermore, other drawbacks are avoided, such as those encountered in connection with the use of fluxes, and which relate notably to the deformation of the products during firing and the risk of break-down if the curing temperature exceeds substantially the optimum temperature.

The products obtained according to the invention generally exhibit, for a given density, a low crystallinity which is similar to that of a conventional product with no addition metal which would have been fired at temperature 100° to 200° C lower than would lead to said given density by the conventional method. When the ion added to the clay is calcium, the pore size in the fired product is 5 to 10 times smaller than in a conventional product of same apparent density. Moreover, the remaining crystallites in the products of the invention are noticeable on account of their small size and good dispersion in the mass of the material. The size of such crystallites is generally not more than 0.1 micron and their amount is generally from 1 to 5% (by weight).

If compared to a conventional product cured at the same temperature, the products of the invention exhibit a higher apparent density (generally by about 20%) and an enhanced mechanical resistance.

Furthermore, the fired products obtained by the invention are remarkable by the absence of free oxides other than $Al_2O_3$ and $SiO_2$, the addition metal being entirely in the form of a compound oxide with aluminum and/or silicium.

The following examples, which should in no way be considered as limitative, illustrate the operation of the invention. The characteristics of the products obtained in these examples (apparent density and rupture modulus) are grouped together after the last example.

EXAMPLE I 20 grams of kaolin of the KOLLOID type
2.4 grams of $Ca(NO_3)_2.4H_2O$ (melting point of dehydrated salt : 561° C) are dry-mixed in a planetary agate ball mill, containing four agate balls having a diameter of 20 mm, and rotating at 800 rpm, during 15 min.

The composition of the KOLLOID kaolin ("Czechoslovak ceramic") is as follows:

| Chemical analysis | | Sensible analysis | |
|---|---|---|---|
| $SiO_2$ | 46.35 % | Argillaceous materials | 98.9 % |
| $Al_2O_3$ | 38.72 % | Quartz | 1.1 % |
| $Fe_2O_3$ | 0.87 % | Feldspar | 0.0 % |
| $TiO_2$ | 0.15 % | Grain size distribution | |
| CaO | 0.24 % | <1 μ | 70 % |
| MgO | 0.02 % | <2 μ | 90 % |
| Alkaline materials | 0.15 % | <3 μ | 93 % |

| Chemical analysis | Sensible analysis |
|---|---|
| Fire loss | 13.51 % |

The powder obtained is pressed under a pressure of 500 kg/cm2 into pellets of 20 mm diameter and about 5 mm thickness.

Then, the pellets are fired in air according to the following heat cycle:
Heating rate : 600° C/hour
Level heating at 900° C during 12 hours
Cooling rate : 150° C/hour

EXAMPLE II 20 grams of KOLLOID kaolin
2.6 grams of $Mg(NO_3)_2.6H_2O$ are dry-mixed in a planetary agate ball mill containing four agate balls having a diameter of 20 mm and rotating at 800 rpm, during 15 min.

Water, in the amount of 20% of the weight of the dry powder is added to the latter, the wet mixture is mixed until an homogeneous paste is obtained.

The paste is extruded through a cylindrical die, of 20 mm diameter, and plugs of 5 mm thickness are cut out from the strand thus obtained.

The plugs are dried in an oven as follows:
8 hours at 50° C and 95% humidity
12 hours at 120° C in the open air The plugs are dried and fired in air according to the following heat cycle:
Heating rate : 600° C/hour
Level heating at 900° C during 12 hours
Cooling rate : 150° C/hour

EXAMPLE III 20 grams of KOLLOID kaolin
0.6 grams of $LiNO_3$ (melting point : 264° C)
are dry-mixed under the same conditions as in the preceding examples.

The dry powder thus obtained is placed into an oven with conditioned atmosphere where it remains 8 hours at 40° C and 100% relative humidity.

The powder thus moistened is pressed under a pressure of 500 kg/cm2, into pellets of 20 mm diameter and 5 mm thickness. Then, the pellets are fired in air according to the following heat cycle:
Heating rate : 600° C/hour
Level heating at 900° C during 12 hours
Cooling rate : 150° C/hour

EXAMPLE IV 20 grams of KOLLOID kaolin
5.2 grams of $Mg(NO_3)_2.6H_2O$ are dry mixed under the same conditions as in the preceding examples.

The powder is gently packed in a porcelain melting pot and submitted to the following heat cycle in the open air:
Heating rate : 150° C/hour
5 mn at 550° C
Cooling rate : 150° C/hour Water, in the amount of 10% by weight is added to the cooled calcined powder thus obtained. The mixture is homogenized by mixing in a planetary agate ball mill, containing 4 agate balls and rotating at 400 r.p.mn, during 10 min.

The moistened ground powder is pressed under 500 kg/cm2 into pellets of 20 mm diameter and about 5 mm thickness, which are then dried.

The pellets are then fired in air according to the following heat cycle:
Heating rate : 600° C/hour
12 hours at 900° C
Cooling rate : 150° C/hour

EXAMPLE V 20 grams of KOLLOID kaolin
5.2 grams of $Mg(NO_3)_2.6H_2O$
are dry mixed under the same conditions as in the preceding examples.

The powder is gently packed in a porcelain melting pot and submitted to the following heat cycle in the open air:
Heating rate : 150° C/hour
5 mn at 550° C/hour
Cooling rate : 150° C/hour The cooled powder is admixed with 10% of his weight of water and the moistened powder is mixed for 10 minutes in a planetary agate ball mill, containing four agate balls and rotating at 400 r.p.mn.

The moistened ground powder is pressed under 500 kg/cm2 into pellets of 20 mm diameter and about 5 mm thickness, which are then dried.

The pellets are fired in air according to the following heat cycle:
Heating rate : 600° C/hour
24 hours at 800° C
Cooling rate : 150° C/hour

EXAMPLE VI 20 grams of KOLLOID kaolin
5.2 grams of $Mg(NO_3)_2.6H_2O$
are dry-mixed under the same conditions as in the preceding examples.

The powder is gently packed in a porcelain melting pot and submitted to the following heat cycle in the open air:
Heating rate : 150° C/hour
5 mn at 550° C
Cooling rate : 150 C/hour The cooled powder is admixed with 10% of his weight of water and the moistened powder is mixed for 10 minutes in a planetary agate ball mill, containing four agate balls and rotating at 400 r.p.mn.

The moistened ground powder is pressed under 500 kg/cm2 into pellets of 20 mm diameter and about 5 mm thickness, which are then dried.

The pellets are fired in air according to the following heat cycle:
Heating rate : 600° C/hour
6 hours at 1000° C.
Cooling rate : 150° C/hour

EXAMPLE VII 20 grams of KOLLOID kaolin
0.8 grams of $NaNO_3$ (melting point : 307° C) are dry-mixed under the same conditions as in the preceding examples.

The powder is placed into a climatic oven (with conditioned atmosphere) for 8 hours, at 40° C and 100% relative humidity.

The moistened powder is pressed under 500 kg/cm2, into pellets of 20 mm diameter and about 5 mm thickness.

The pellets are fired in air according to the following heat cycle:
Heating rate : 600° C/hour
12 hours at 900° C
Cooling rate : 150° C/hour

EXAMPLE VIII

A solution is prepared, containing:
50 ml water
1.14 grams $Mg(NO_3)_2.6H_2O$
1.04 grams $Cu(NO_3)_2.2H_2O$
1.210 grams $C_6H_8O_7.H_2O$ (citric acid)

This solution is slowly heated up to boiling and then kept boiling for one hour, water being further added meanwhile in order to compensate for the evaporation losses. After 1 hour, the solution is boiled down to about 6 ml.

These 6 ml of solution are incorporated into 20 grams of KOLLOID kaolin; the mixture is mixed so as to obtain a homogeneous plastic paste.

This paste is extruded through a 20 mm diameter die and the strand thus obtained is cut into plugs of 5 mm thickness.

The plugs are dried in an oven as follows:
8 hours at 50° C and 95% humidity
12 hours at 120° C in the open air The dried plugs are fired in air according to the following heat cycle:
Heating rate : 600° C/hour
6 hours at 900° C
Cooling rate : 150° C/hour

EXAMPLE IX 20 grams of KOLLOID kaolin
0.73 gram of $KCOH_2$ (potassium formate)
are dry-mixed for 15 min. in a planetary agate ball mill containing four agate balls of 20 mm diameter and rotating at 800 r.p.m.

The powder obtained is placed into a climatic oven (with conditioned atmosphere) for 8 hours, at 40° C and 100% relative humidity.

The moistened powder is pressed under 500 kg per cm2, into pellets of 20 mm diameter and about 5 mm thickness.

The pellets are fired in air according to the following heat cycle:
Heating rate : 600° C/hour
6 hours at 1000° C
Cooling rate : 150° C/hour

EXAMPLE X 20 grams of KOLLOID kaolin
2.15 grams of anhydrous $CaCl_2$
are dry-mixed as in the preceding example.

The powder obtained is placed in a climatic oven for 10 min. at 30° C and 100% humidity.

The moistened powder is pressed under 500 kg per cm2 into pellets of 20 mm diameter and about 5 mm thickness.

The pellets are fired in the open air according to the following heat cycle:
Heating rate : 600° C/hour
12 hours at 900° C
Cooling rate : 150° C/hour

EXAMPLE XI 20 grams of KOLLOID kaolin
0.7 grams of $NaNO_3$
1.2 grams of $NaC_2H_3O_2.3H_2O$ (sodium acetate)
are dry-mixed in the same conditions as in example IX.

The powder is then gently packed in a porcelain melting pot and submitted to the following heat treatment:
Heating rate : 150° C/hour
15 min. at 500° C
Cooling rate : 150° C/hour The powder obtained is then ground for 10 min. in a planetary agate ball mill, with four agate balls, rotating at 800 r.p.m.

The ground powder is placed in a climatic oven, at 40° C and 100% humidity for 8 hours.

The moistened powder is pressed under 500 kg per cm2, into pellets of 20 mm diameter and about 5 mm thickness.

The pellets are fired in air, according to the following heat cycle:
Heating rate : 600° C/hour
12 hours at 900° C
Cooling rate : 150° C/hour

EXAMPLE XII 20 grams of kaolin KOLLOID
4.4 grams of baryum oxalate $(BaC_2O_4)$
are dry-mixed in the same conditions as in example IX.

The powder obtained is gently packed in a porcelain melting pot and submitted to the following heat treatment:
Heating rate : 150° C/hour
10 min. at 500° C
Cooling rate : 150° C/hour The cooled powder is admixed with water in the amount of 10% by weight of the powder and mixed for 10 minutes in a planetary agate ball mill containing four agate balls of 20 mm diameter and rotating at 400 r.p.m.

The moistened powder obtained is pressed under 500 kg/cm2 into pellets of 20 mm diameter and about 5 mm thickness.

The pellets are then fired in the air according to the following heat cycle:
Heating rate : 600° C/hour
6 hours at 900° C
Cooling rate : 150° C/hour

EXAMPLE XIII 25 grams of "Ball Clay"
5 grams of $Ca(NO_3)_2.4H_2O$
are dry-mixed in the same conditions as in example IX.

"Ball clay 672" used (English China Clay Group) has the following composition:

| | Chemical analysis | Sensible analysis | | Grain size distribution | |
|---|---|---|---|---|---|
| $SiO_2$ | 46.76% | Argillaceous Materials | 72.0% | $<5\ \mu$ | : 96 % |
| $Al_2O_3$ | 36.42% | Micaceous mat. | 20.5% | $<2\ \mu$ | : 94 % |
| $Fe_2O_3$ | 1.15% | Quartz | 3.5% | $<1\ \mu$ | : 87 % |

-continued

| Chemical analysis | | Sensible analysis | | Grain size distribution | |
| --- | --- | --- | --- | --- | --- |
| $TiO_2$ | 0.74% | Lime | 0.3% | <0,5 μ | : 71 % |
| MgO | 0.27% | Ferric oxide | 1.2% | <0,2 μ | : 26 % |
| CaO | 0.34% | Titanium | 0.7% | | |
| $K_2O$ | 2.36% | Magnesia | 0.3% | | |
| $Na_2O$ | 0.40% | Organic materials | 1.5% | | |
| Fire losses | 12.20% | | | | |

The powder is slightly packed into a porcelain melting pot and submitted to the following heat treatment:
Heating rate : 150° C/hour
10 min. at 550° C
Cooling rate 150° C/hour The cooled powder is admixed with 10 grams of ground silica and water in the amount of 10% of the total weight. The silica powder used is "SNOWIT ground silica" (a product of SIMINAL, from BELGIUM), the analysis of which is as follows:

| Chemical analysis | | Grain size distribution | |
| --- | --- | --- | --- |
| $SiO_2$ | 99.502 % (quartz) | <60 μ | 99.47 % |
| $Fe_2O_3$ | 0.028 % | <75 μ | 99.96 % |
| $Al_2O_3$ | 0.157 % | <100 μ | 100.0 % |

The mixture obtained is mixed in a planetary agate ball mill containing four agate balls of 20 mm diameter and rotating at 400 r.p.m. during 10 minutes.

The moistened powder is then pressed under 500 kg/cm2, into pellets of 20 mm diameter and about 5 mm thickness.

The pellets are fired in air, according to the following heat cycle:
Heating rate : 600° C/hour
12 hours at 900° C
Cooling rate : 150° C As a comparison, a mixture of 25 g clay and 10 g silica prepared in a similar way but without adding calcium nitrate must be fired at 1100° C to obtain a product of similar apparent density.

EXAMPLE XIV

A mixture is prepared by dry-blending, in a planetary ball mill with agate balls, containing four agate balls of 20 mm diameter, rotating at 800 r.p.m., for 15 minutes:
20 g Kolloid kaolin
2 g $CaCO_3$ The mixture is poured into 200 ml of 0.05 molar solution of $CaCl_2$ (pH of the solution : 7.5). The slurry obtained is kept under stirring for 6 hours. Then it is allowed to stand at ambient temperature for twelve hours. The slurry is then filtered, dried for 48 hours at 120° C, and reground under the same conditions as above. The powder is humidified for 5 hours in an oven, at 50° C and 100% humidity.

The powder thus obtained is pressed into pellets of 15 mm diameter and about 3 mm thickness, under a pressure of 600 kg/cm2.

The pellets are baked or fired in air according to the following heat cycle:
Heating rate : 300° C per hour
Level heating at 900° C for 20 hours
Cooling rate : 300° C per hour

EXAMPLE XV

A dry-blend is made according to Example XIV, from:
20 g Kolloid kaolin
2 g $CaCO_3$ The mixture is poured into 200 ml of 0.05 molar solution of $Ca(OH)_2$ (pH of the solution : 12.5).

The slurry thus obtained is subjected to the same treatments as in example XIV. The pellets obtained from this slurry are fired under the same conditions as in example XIV.

EXAMPLE XVI

Procedure is the same as in example XIV, except that the mechanically made mixture of clay and calcium carbonate is poured into 200 ml of 0.05 N HCl solution.

EXAMPLE XVII

A dry-blend mixture is made according to example XIV from:
20 g Kolloid kaolin
2 g $CaCO_3$ The mixture obtained is moistened with 30% of his weight of a 0.05 molar $CaCl_2$ solution.

The paste thus obtained is allowed to age for 24 hours, at ambient temperature, in an atmosphere saturated with moisture. It is dried for 12 hours at 120° C in the open air. It is then milled as in the example XIV. The powder is rehumidified in a climatic oven at 50° C, 100% humidity, for 24 hours.

The powder obtained is pressed into pellets and fired exactly as in Example XIV.

EXAMPLE XVIII

A dry-blend mixture is made according to Example XIV from:
20 g Kolloid kaolin
1.2 g CaO The mixture obtained is moistened with 30% of his weight of a 0.05 molar $Ca(OH)_2$ solution.

The paste thus obtained is placed in an autoclave at 150° C for 24 hours. It is then dried, ground again, humidified in a climatic stove, formed into pellets and fired as described in example XIV.

EXAMPLE XIX

In the same conditions as in the previous examples,
25 g Kolloid kaolin
1.35 g anhydrous $CuCl_2$
are dry-mixed in an agate ball mill. The powder obtained is placed in a climatic oven for 8 hours at 40° C and 100% humidity.

The moistened powder is pressed under a 500kg per cm2 pressure into pellets of 20 mm diameter and about 5 mm thickness. The pellets are then fired in air, according to the following heat cycle:
  Heating rate: 600° C per hour
  Level temperature: 900° C for 12 hours
  Cooling rate: 150° C per hour
Other pellets are prepared and fired in the same way except that $CuCl_2$ was replaced by:
  $Cu(NO_3)_2 \cdot 3H_2O$
  $CuSO_4$ or
  $CuSO_4 \cdot 5 H_2O$

EXAMPLE XX

The following components are dry-mixed in the same conditions as in the previous examples:
  25 g Kolloid kaolin
  2.33 g iron oxalate $Fe_2(C_2O_4)_3 \cdot 5 H_2O$ An amount of 7 ml water is added to the mixture, which is then pugged untill a plastic paste is obtained. The paste is extruded through a die of 20 mm diameter and the cord obtained is cut into plugs of about 5 mm thickness. The plugs are dried in a climatic oven during 8 hours at 50° C and 95% humidity, then during 12 hours at 120° C. The plugs are then fired in air according to the same heat cycle as in the preceding example.

Other plugs are prepared and fired in the same way, except that the following salts are used instead of iron oxalate:

| | |
|---|---|
| $FeCl_3$ ou $FeCl_3 \cdot 2½ H_2O$ | |
| $Fe(C_2H_3O_2)_3 \cdot 4 H_2O$ | (acetate) |
| $Fe(C_3H_5O_3)_3$ | (lactate) |
| $Fe(C_4H_4O_5)_3$ | (maleic salt) |
| $Fe(NO_3)_3 \cdot 6 H_2O$ ou $9 H_2O$ | (nitrates) |
| $Fe_2(SO_4)_3 \cdot 9 H_2O$ | (sulphate) |

EXAMPLE XXI

The following components are dry-mixed in the same conditions as in the preceding example:
  25 g Kolloid kaolin
  3.25 g $Pb(C_2H_3O_2)_2$ (anhydrous lead acetate)
  7 ml water are added in the powder so as to obtain a plastic paste as in the preceding example.

The paste is formed and dried as in the preceding example. The pellets are fired according to the following heat cycle:
  Heating rate: 600° C per hour
  Level temperature: 950° C for 12 hours
  Cooling rate: 150° C per hour Pellets are prepared and fired in the same way using the following salts instead of anhydrous lead acetate:

| | |
|---|---|
| $Pb_2(OH)(C_2H_3O_2)_2$ | (basic acetate) |
| $Pb(C_2H_3O_2)_2 \cdot 10$ ou $3 H_2O$ | (hydrated acetate) |
| $Pb_3(C_6H_5O_7)_2 \cdot 3 H_2O$ | (citrate) |
| $Pb(NO_3)_2$ | (nitrate) |

EXAMPLE XXII

The following components are dry-mixed in the same conditions as in the preceding example:
  25 g Kolloid kaolin
  3.2 g anhydrous zinc sulphate
  8 ml water are added to the mixture and the paste obtained is formed and dried as already described. The pellets are fired according to the same heat cycle as in example XIX.

Other pellets are prepared and fired in the same way, using the following salts instead of anhydrous zinc sulphate:

| | |
|---|---|
| $Zn(C_2H_3O_2)_2$ | (acetate) |
| $ZnCl_2$ | (chloride) |
| $Zn(NO_3)_2 \cdot 3$ ou $6 H_2O$ | (nitrates) |
| $ZnSO_4 \cdot 6 H_2O$ ou $ZnSO_4 \cdot 7 H_2O$ | (sulphates) |

The following table indicates the mean values of the apparent density and tensile rupture modulus measured for the various samples manufactured as described in the examples. Each figure represents the mean value from 10 measurements. The measurement of the tensile rupture modulus is performed according to the Bresilian test standards (indirect traction test).

TABLE

| Example n° | Mineralizing compound content (oxide % by weight) | Apparent density (g/cm³) | Tensile rupture modulus (Kgf/cm²) (± 10 %) |
|---|---|---|---|
| I | 2.73 | 1.65 | 210 |
| II | 1.97 | 1.60 | 200 |
| III | 0.74 | 1.62 | 210 |
| IV | 4.34 | 1.95 | 350 |
| V | 4.34 | 1.60 | 150 |
| VI | 4.34 | 2.10 | 400 |
| VII | 1.52 | 1.65 | 120 |
| VIII | 2.91 | 1.80 | 230 |
| IX | 2.30 | 1.62 | 110 |
| X | 5.94 | 2.20 | 420 |
| XI | 3.37 | 1.85 | 200 |
| XII | 14.82 | 2.25 | 430 |
| XIII | 3.58 | 1.95 | 250 |
| XIV | | 1.77 | 285 |
| XV | | 1.79 | 240 |
| XVI | | 1.75 | 239 |
| XVII | | 1.80 | 310 |
| XVIII | | 1.83 | 327 |

The various weight percentages of the metal compounds, which are added to the clay in the above examples, correspond to molar percentages which are in each case within the range 1–40% molar with respect to kaolinite, the molecular weight of the latter being 258 grams; which means that it corresponds to substantially the same range with respect to the alumina contained in the kaolinite, since the latter has the following formula:

$2SiO_2, Al_2O_3, 2 H_2O$. The metal salts are used as dry and pure products.

Of course, the invention cannot by any means be restricted to specific conditions of performing the method described in the examples.

We claim:
1. A method for the treatment of clay compositions, comprising
  contacting the clay composition with a liquid phase containing metal ions in a concentration of at least 0.001 gram equivalent per liter, in sufficient amount to provide a total of from 1 to 40 mole percent of said metal ion based on contained alumina in said clay composition, for a sufficiently long time period to ensure diffusion of said ions throughout the clay composition, wherein the metal of said metal ions is capable of forming its oxide at a temperature at or below the firing temperature of the clay composition; and firing the resulting impregnated clay composition at a temperature of from 750°–1100° C. whereby said metal ions are transformed into the corresponding oxides.

2. A method according to claim 1, wherein said ions are supplied by a solid compound containing said ions, said solid compound being present in admixture with the clay, and said ions are at least partially dissolved or melted into said liquid phase.

3. A method according to claim 1 wherein said ions are distributed in the clay in a proportion from 5 to 20 mole %, with respect to the alumina content in the clay.

4. A method according to claim 1, wherein said ions are of a metal selected from alkali metals, alkaline-earth metals and transition metals.

5. Method for the treatment of clay compositions, comprising impregnating the clay with at least one compound comprising metal ions in liquid form, either in solution or melted, said metal compound being capable of forming its oxide at a temperature at or below the firing temperature of the thus-impregnated clay; and firing the resulting impregnated clay composition at a temperature of from 750°–1100° C. whereby said metal ions are transformed into the corresponding oxides.

6. A method according to claim 5, wherein the amount of the impregnating compound is such that the content of the corresponding oxide in said composition is from 1 to 40 mole % based on the alumina comprised in said clay composition.

7. A method according to claim 5, wherein the impregnating compound is a metal salt of an organic or inorganic acid, said metal being selected from alkali metals, alkaline-earth metals and transition metals.

8. A method according to claim 5, wherein the impregnating compound is admixed with the clay in the solid state and then melted or dissolved.

9. A method according to claim 7 wherein the compound is an alkaline-earth metal.

10. A method for the treatment of clay compositions, comprising maintaining a mixture of the clay with a solid compound of a metal ion in contact with a liquid phase containing the same ions in a concentration of at least 0.001 gram equivalent per liter, said metal ions being present in sufficient amount to provide a total of from 1 to 40 mole percent of said metal ion based on contained alumina in said clay composition, for a sufficiently long time period to ensure diffusion of said ions throughout the clay composition, wherein the metal of said metal ions is capable of forming its oxide at a temperature at or below the firing temperature of the clay composition; and firing the resulting impregnated clay composition at a temperature of from 750°–1100° C. whereby said metal ions are transformed into the corresponding oxides.

11. A method according to claim 10, wherein said contact is maintained for a time period of from 10 to 100 hours.

12. A method according to claim 11, wherein the impregnated clay composition is subjected to drying and grinding, and a humidifying treatment of the powder obtained, at a temperature of 30° to 200° C and under an atmosphere of substantially 100% humidity, prior to firing the resulting composition.

13. A method according to claim 10, wherein said ions are of a metal selected from alkali metals, alkaline-earth metals, and transition metals.

14. A method according to claim 13, wherein said ions are calcium ions, introduced into the clay in the form of the carbonates or oxides thereof and dissolved in the form of the chloride or hydroxide in said liquid phase.

15. A method according to claim 1 further comprising the calcination of the impregnated clay composition at a temperature at least equal to the decomposition temperature of said metal ion prior to firing of the composition.

16. A method in accordance with claim 15, wherein said calcination is carried out at a temperature from 400° C to 600° C.

17. A method according to claim 1 further comprising the forming or shaping of the impregnated clay composition prior to firing thereof.

18. A method according to claim 15 further comprising shaping the calcinated mixture.

19. A method according to claim 15, wherein the firing is carried out at a temperature from 800° to 1000° C.

20. A method according to claim 19 wherein firing temperature is from 800° to 900° C.

21. A method according to claim 1 wherein the clay composition consists substantially of kaolinite.

* * * * *